United States Patent [19]

Nezu et al.

[11] 4,344,703

[45] Aug. 17, 1982

[54] COPYING MACHINE WITH RETRACTABLE STOPPER

[75] Inventors: Takao Nezu, Hamura; Yasuo Turubuchi, Kiyose, both of Japan

[73] Assignee: Konishiroku Photo Industry Co., Ltd., Tokyo, Japan

[21] Appl. No.: 210,000

[22] Filed: Nov. 24, 1980

[30] Foreign Application Priority Data

Nov. 27, 1979 [JP] Japan .................. 54-164032

[51] Int. Cl.³ ............................................. B65H 9/04
[52] U.S. Cl. ....................................... 355/76; 271/245
[58] Field of Search ................. 355/3 SH, 14 SH, 75, 355/76; 271/245, 246, 275

[56] References Cited

U.S. PATENT DOCUMENTS 3,716,227 2/1973 Bottcher .............................. 271/246
3,844,552 10/1974 Bleau et al. .......................... 355/75
4,170,414 10/1979 Hubert et al. ..................... 355/3 SH
4,179,215 12/1979 Hage ............................... 355/3 SH Primary Examiner—L. T. Hix
Assistant Examiner—Alan Mathews
Attorney, Agent, or Firm—James E. Nilles

[57] ABSTRACT

A copying machine wherein a retractable stopper device including at least one stopper portion which is normally projected is provided at an original discharge side of the exposure section, and the stopper device is retracted forcibly after the exposure is completed. The retractable stopper device further comprises a pair of leg portions provided on both sides of the member, respectively, compression springs fitted around the leg portions for urging the member upwardly, and a pair of projections projected upwardly and mounted at the both sides of the stopper member.

7 Claims, 4 Drawing Figures

COPYING MACHINE WITH RETRACTABLE STOPPER

BACKGROUND OF THE INVENTION

1. Field of the Invention

The present invention relates to a copying machine, more particularly to a copying machine having an automatic document feeding apparatus, for example.

2. Description of the Prior Art

In a copying machine having an automatic document feeding apparatus or semi-automatic document feeding apparatus (referred to as automatic document feeding apparatus, hereinafter, in convenience sake), the feeding of an original on which the exposure has been completed is disturbed if a projection, such as a rule for positioning, is provided on a copy board glass for exposing an original to be copied or thereabout, as in a copying machine in which the copying is completed after an original is inserted manually or automatically on the copy board glass. Accordingly, in a conventional copying machine having an automatic document feeding apparatus, stoppers which can be lowered from the copy board glass are provided in the automatic document feeding apparatus, so that the leading end of an original can be positioned by the stoppers when the original is supplied automatically. However, even in a copying machine having an automatic document feeding apparatus, it is required frequently to insert the original manually. In this case, a long time must be spent for positioning of the original, because the original must be positioned precisely on the basis of a mark etc. stamped or attached on the copy board glass at the original exposure section.

SUMMARY OF THE INVENTION

An object of the present invention is to provide a copying machine having a stopper device which can solve the above-mentioned inconvenience in the conventional copying machine.

Another object of the present invention is to provide a copying machine having a stopper device which serves as a stopper for stopping the leading end of an original when an automatic document feeding apparatus is used and serves as a rule for positioning an original when the original is inserted on the copy board, manually.

Other objects and features of the present invention will become clear from the following description of the preferred embodiment taken in conjunction with the accompanying drawings.

DESCRIPTION OF THE PREFERRED EMBODIMENT

Figure 1:
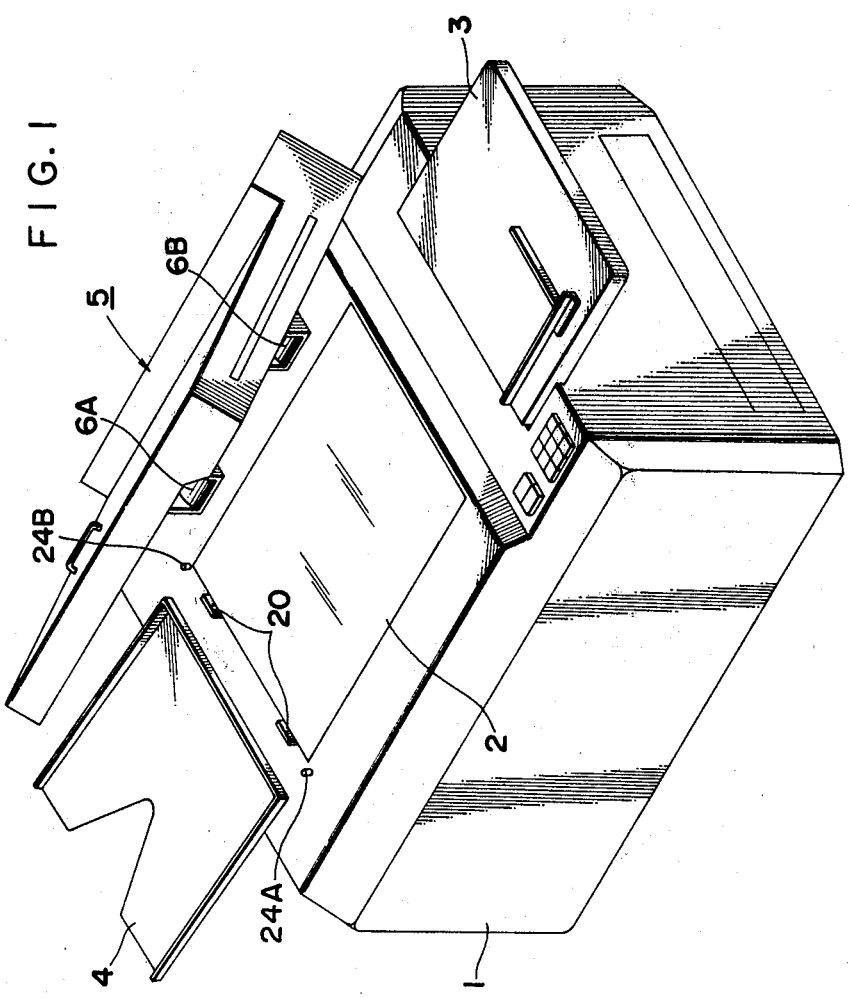
FIG. 1 is a perspective view of the whole part of a copying machine in accordance with the invention.
Figure 2:
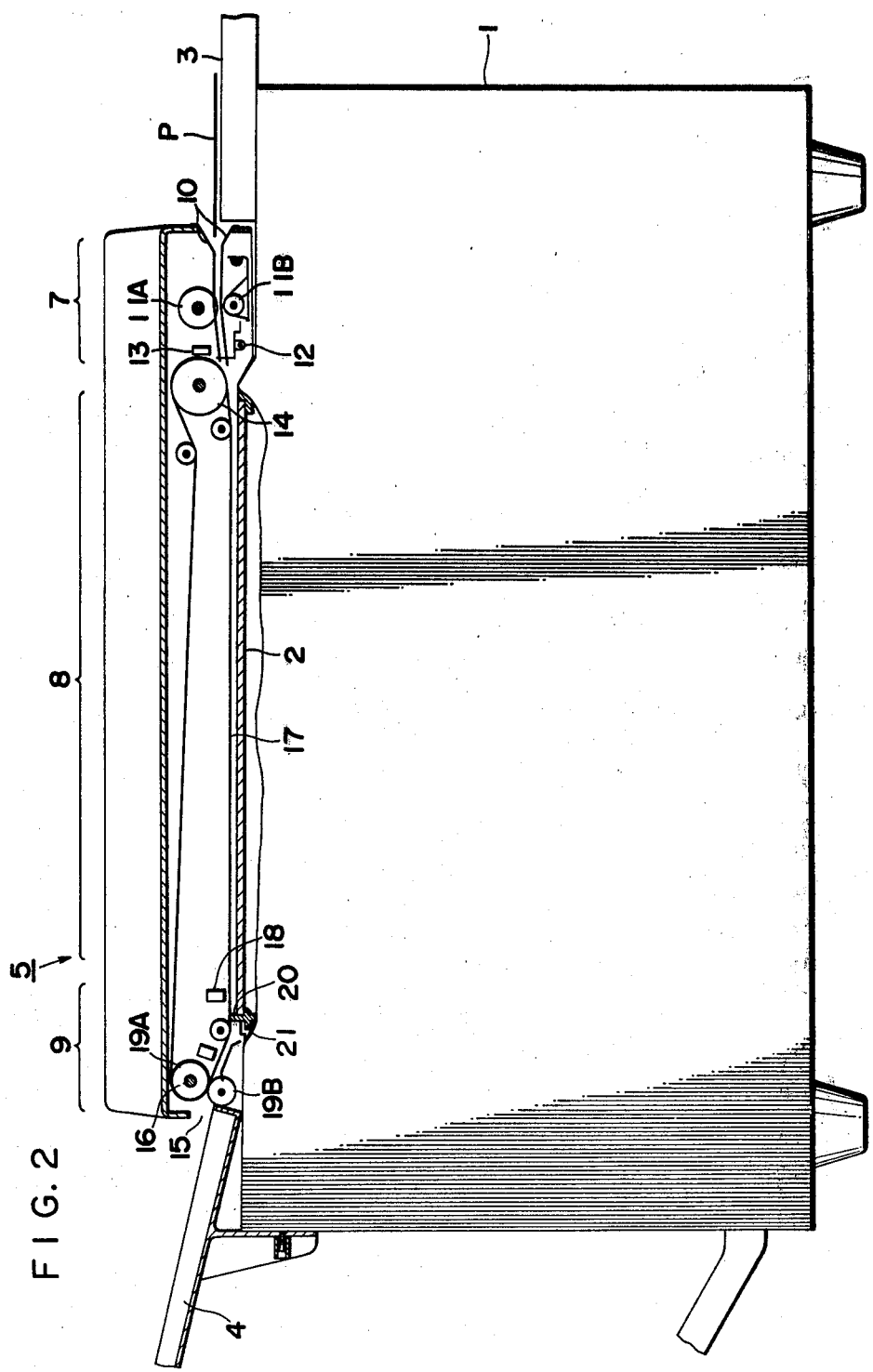
FIG. 2 is a front elevational view of the copying machine with a part thereof being removed.

Referring to FIGS. 1 and 2, a copying machine portion generally designated with the reference numeral 1 is provided at its top portion with a copy board glass 2 on which an original is placed for the exposure and copying. An original receiver 3 and a discharged original tray 4 are attached to the left and right sides at top portion of the copying machine portion 1, so as to oppose to each other across the copy board glass 2. Therefore, the originals received by the original receiver 3 are taken one by one onto the copy board glass 2 by an automatic document feeding apparatus 5 which will be mentioned later, and are successively discharged to the discharged original tray 4 by the same apparatus 5.

The automatic document feedng apparatus 5 is disposed on the copying machine portion 1 in such a manner as to overlie and cover the copy board glass 2. The automatic document feeding apparatus 5 is adapted to be opened to transverse direction in view of the transporting direction of the original and to be copied stopped at any open angle by means of a pair of support means 6A, 6B which are mounted at the rear side of the upper face of the copying machine portion 1. As will be seen from FIG. 2, the automatic document feeding apparatus 5 is provided with a supply section 7, transfer section 8 and an ejection section 9 which are arranged in series in the mentioned order in the supplying direction of the original P. The supply section 7 has supply rollers 11A, 11B attached to a guide plate 10, as well as a gate member 12. The movement of the supply rollers 11A, 11B into and out of pressure contact with each other, rotation of these rollers and the retracting movement of the gate member 12, are made in accordance with a detection signal delivered by a first detector 13 adapted to detect the leading end of the original P.

The transfer section 8 includes a drive roller or pulley 14 positioned adjacent to the guide plate 10, a driven roller or pulley 16 disposed at a discharge port 15 and a transfer belt 17 stretched between these pulleys 14, 16. The transfer belt 17 has a white transferring side. The drive pulley 14 is controlled to be stopped when the leading end of the original P is detected by a second detector 18 on the copy board glass 2 and is started again in accordance with an exposure completion signal from the copying machine.

The discharge section 9 comprises a discharge roller 19A coaxial with the aforementioned driven pulley 16, and a discharge roller 19B which makes rolling contact with the roller 19A. The arrangement is such that the original P after the exposure is discharged to the discharged original tray 4 by the rotation of the discharge rollers 19A, 19B. A reference numeral 20 in FIGS. 1 and 2 designate a stopper for locating the leading end of the original P at the exposure section.

Figure 3:
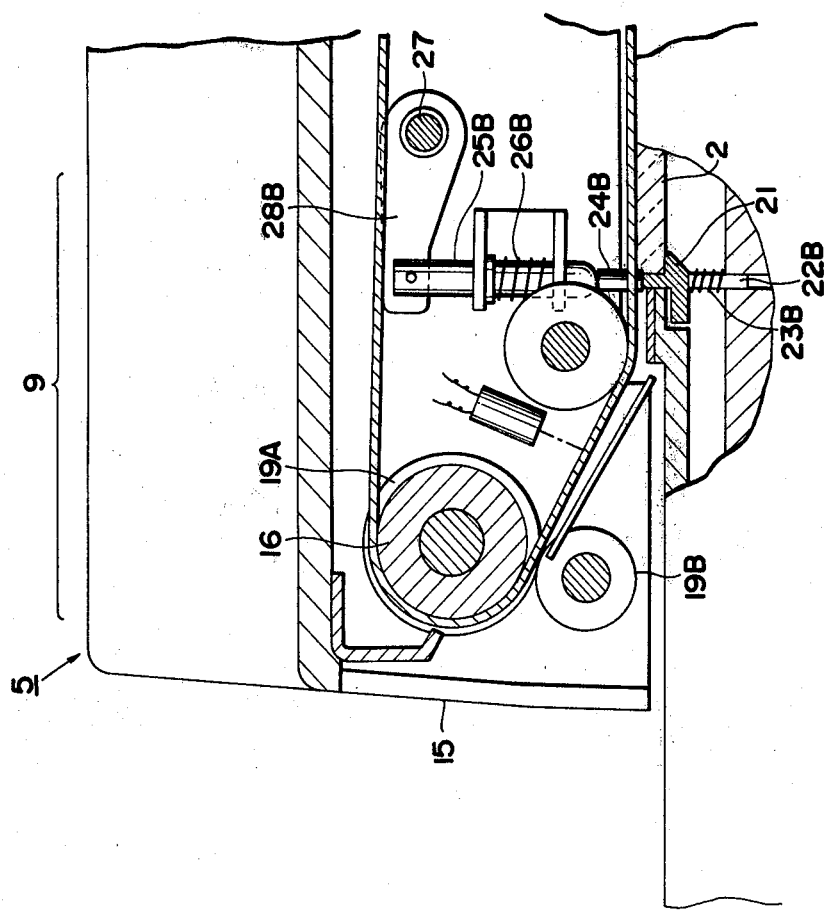
FIG. 3 is an enlarged sectional view of the copying machine.
Figure 4:
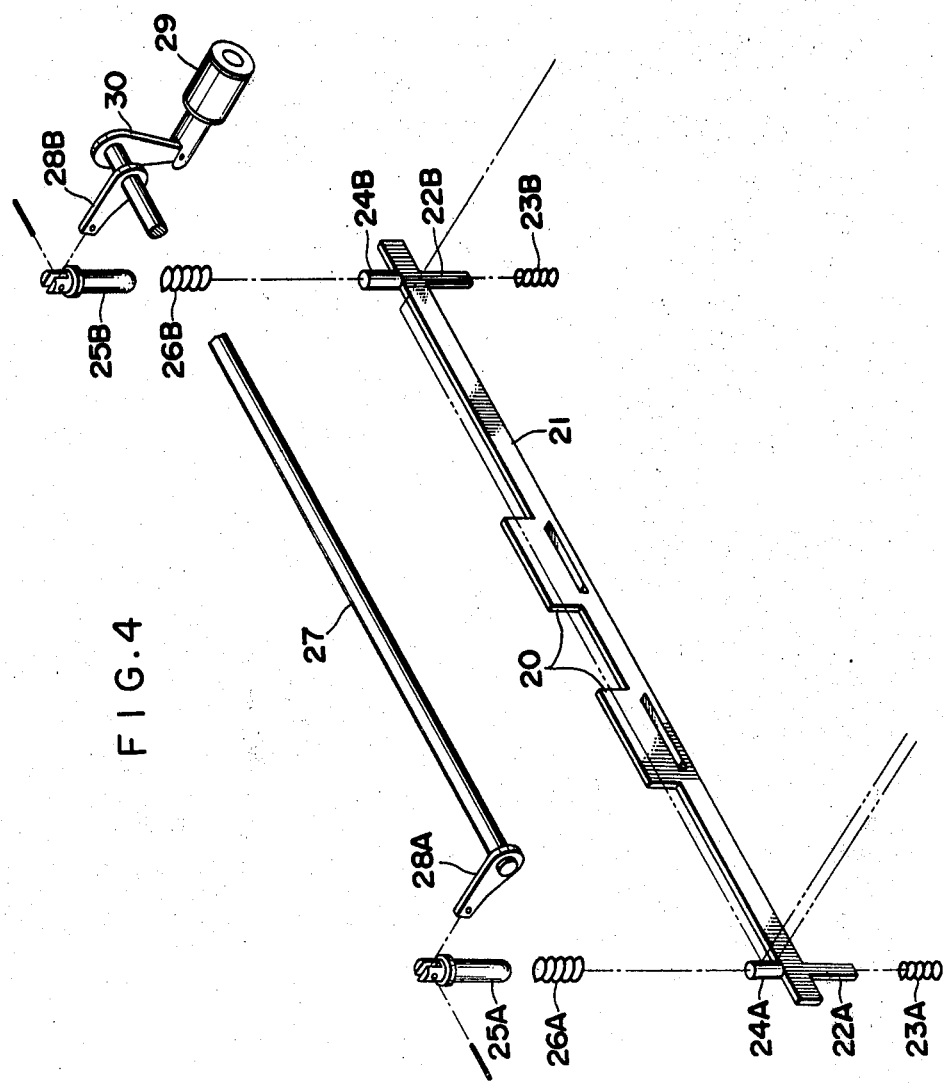
FIG. 4 is an exploded perspective view of control means of a stopper.

FIGS. 3 and 4 show the feature of the present invention. More specifically, referring to FIGS. 3 and 4, a member 21 arranged in the copying machine portion 1 and elongated in the transverse direction to original feeding direction is formed integrally with said stopper 20 projected above the copy board glass 2 in the vicinity of one side of the copy board glass 2 at the original exposure section. A pair of leg portions 22A, 22B are formed integrally with both sides of said member 21, respectively. Said stopper 20 is urged so as to project above said copy board glass 2 by compression springs 23A, 23B fitted around said leg portions 22A, 22B, respectively. The both sides of the member 21 are provided integrally with a pair of projections 24A, 24B projected upwardly, respectively, at side portions (front side and rear side at one side of the copy board 2) of the copy board glass 2, respectively.

Further, in said automatic document feeding apparatus, control means for controlling said stopper 20 is mounted. This control means has a pair of push members 25A, 25B supported movably up and down by said automatic document feeding apparatus 5 at positions corresponding to said projections 24A, 24B, respectively. The push members 25A, 25B are urged upwardly by return springs 26A, 26B, respectively, and connected by pins (no reference symbol) to levers 28A, 28B. The levers 28A, 28B are mounted on both sides of a control rod 27, respectively, which is arranged in parallel to said member 21 and mounted on said automatic document feeding apparatus 5. Said control rod 27 is fixed at one end thereof with a drive lever 30 connected to a solenoid 29 which is energized through a predetermined duration of time by an exposure completion signal from the copying machine portion 1.

In the copying machine of the present invention, the original on which the exposure has been completed can be discharged without receiving any obstruction, because the stopper is retracted beneath the copy board glass by the signal from the copying machine portion when the exposure of the original is finished in case that the automatic document feeding apparatus is used. Further, in case that the original is to be inserted manually, the positioning of the original can easily be performed by using the stopper projected above the copy board glass as a rule, because the automatic document feeding apparatus is opened as shown in FIG. 1.

As will be appreciated from the description described above, it is preferable in a case that the automatic document feeding apparatus is equipped at one's option. In that case, it is needless to say that stopper which is being urged to one direction so as to project on the copy board must be prepared, previously.

What is claimed is:

1. In a copying machine comprising a copy board having an exposure section, and a document feeding apparatus overlying the copy board for supplying the original to be copied on the exposure section and for discharging the original after the exposure is completed, the improvement characterized in that a retractable stopper device including at least one stopper portion which is normally projected is provided on the copy board at an original discharge side of the exposure section in the copying machine, and means mounted on the document feeding apparatus and engageable with the stopper device whereby the stopper device is retracted forcibly after the exposure is completed.

2. A copying machine as claimed in claim 1, wherein the retractable stopper device further comprises a pair of leg portions provided on both sides of the stopper device, respectively, compression springs fitted around the leg portions for urging the stopper device upwardly, and a pair of projections projected upwardly and mounted at both sides of the stopper device for engagement with the means mounted on the document feeding apparatus.

3. A copying machine as claimed in claim 2, wherein the means for forcibly retracting the stopper device comprises a pair of push members supported movably up and down by the document feeding apparatus at positions corresponding to that of the projections, respectively, a pair of levers, each lever being connected at one end thereof to a push member, a control rod mounted at both sides thereof to the other ends of the levers, a drive lever connected at one side thereof to one side of the control rod, and a solenoid connected to the other side of the drive lever, which is energized by an exposure completion signal from the copying machine portion.

4. A copying machine as claimed in claim 1 comprising biasing means for urging the retractable stopper device upwardly.

5. A copying machine as claimed in claim 4 wherein the retractable stopper device comprises at least one projection projecting upwardly along a side of the stopper portion, and wherein the means on the document feeding apparatus comprises at least one movable push member engageable with the one projection of the stopper device.

6. A copying machine as claimed in claim 5 wherein the stopper device comprises at least one leg portion and wherein the biasing means comprises at least one spring disposed around the leg portion.

7. A copying machine as claimed in claim 6 wherein the means mounted on the document feeding apparatus comprises a solenoid for effecting movement of the push member.

* * * * *